US010459675B2

(12) United States Patent
Hashem

(10) Patent No.: US 10,459,675 B2
(45) Date of Patent: Oct. 29, 2019

(54) SYSTEM AND METHOD FOR CONTROLLING A PROCESS LINE USING A PLC AND SCALABLE HMI CONTROL TEMPLATE

(71) Applicant: Fives Inc., Farmington Hills, MI (US)

(72) Inventor: Amjad Hashem, Dearborn, MI (US)

(73) Assignee: Fives Cinetic Corp., Farmington Hills, MI (US)

(*) Notice: Subject to any disclaimer, the term of this patent is extended or adjusted under 35 U.S.C. 154(b) by 487 days.

(21) Appl. No.: 15/254,658

(22) Filed: Sep. 1, 2016

(65) Prior Publication Data

US 2017/0068498 A1  Mar. 9, 2017

Related U.S. Application Data

(60) Provisional application No. 62/214,620, filed on Sep. 4, 2015.

(51) Int. Cl.
*G05B 19/05* (2006.01)
*G05B 19/409* (2006.01)
*G06F 3/0482* (2013.01)
*G06F 3/0484* (2013.01)
*G06F 3/14* (2006.01)
*G05B 19/414* (2006.01)

(52) U.S. Cl.
CPC ......... *G06F 3/1423* (2013.01); *G05B 19/054* (2013.01); *G05B 19/409* (2013.01); *G05B 19/4145* (2013.01); *G06F 3/0482* (2013.01); *G06F 3/0484* (2013.01); *G05B 2219/36155* (2013.01); *G06F 3/04845* (2013.01)

(58) Field of Classification Search
CPC ................ G05B 19/054; G05B 19/409; G05B 19/4145; G05B 2219/36155; G06F 3/0482; G06F 3/0484; G06F 3/04845; G06F 3/1423
See application file for complete search history.

(56) References Cited

U.S. PATENT DOCUMENTS 7,707,126 B2 * 4/2010 Klein .................. G05B 19/058
706/12
8,942,834 B2 * 1/2015 Johnston ............ G05B 19/0426
700/18
9,395,891 B2 * 7/2016 Timsjo ............... G05B 23/0272
(Continued)

Primary Examiner — Abdelmoniem I Elamin
(74) Attorney, Agent, or Firm — Quinn IP Law

(57) ABSTRACT

A method and control system control a process line by providing a PLC with control screens each having a unique screen number. Each HMI device is provided access to a first set of the control screens, with displayed buttons labeled with a corresponding one of the control screens. Input signals are received from a requesting HMI device that identifies the requesting HMI device and requests a control action or a monitoring action for a corresponding workstation. Additionally, the requesting HMI device is provided access to a second set of the control screens based on the received input signals, such that the HMI devices share an HMI control template that is also dynamically and individually scalable to the requesting HMI device. The process line is then controlled via the PLC in response to control signals from the HMI devices corresponding to selections from the control screens.

15 Claims, 7 Drawing Sheets

(56) References Cited

U.S. PATENT DOCUMENTS

| | | | | |
|---|---|---|---|---|
| 2004/0021679 | A1* | 2/2004 | Chapman | G05B 15/02 715/700 |
| 2006/0031715 | A1* | 2/2006 | Klein | G05B 19/058 714/23 |
| 2008/0183303 | A1* | 7/2008 | West | H04L 12/283 700/2 |
| 2010/0283435 | A1* | 11/2010 | Bremer | G05F 1/70 323/211 |
| 2013/0131840 | A1* | 5/2013 | Govindaraj | G05B 19/41865 700/19 |
| 2013/0325153 | A1* | 12/2013 | Kobayashi | G05B 19/056 700/87 |
| 2016/0179085 | A1* | 6/2016 | Seitz | G05B 19/414 700/180 |

* cited by examiner

| OK | Dry Cycle | In Cycle | Station Name | Manual Movement | ⬤ | 9/3/2015 1:20:05 PM |
|---|---|---|---|---|---|---|
| 45 | 43 | 44 | 47 | 46 | 42 | 48 |

▲ Header

| △ LH ENABLE SYM / LH COMPLETE SYM | 1.2 | Motion1 | RH ENABLE SYM / RH COMPLETE SYM △ |
| △ LH ENABLE SYM / LH COMPLETE SYM | 0.9 | Lift & Locate | RH ENABLE SYM / RH COMPLETE SYM △ |
| △ FORWARD / RUNNING FWD | 0.0 | Conveyors | REVERS / RUNNING RVRS △ |

Page [1] of 1

| Symbol Absolute | Page Up | Page Down |
| Global Motions | | | | | | Main Screen |

▲ Navigation Bar

*Fig-4*

| | | | | | | | | |
|---|---|---|---|---|---|---|---|---|
| OK | Dry Cycle | | Home | | Station Name | Part Counter | ○ | 9/3/2015 1:21:36 PM |
| 45 | 43 | | 44 | | 47 | 46 | 42 | 48 |

Header

Station #1

Totals

| | Reset Year | Year | Month | Day | Shift | |
|---|---|---|---|---|---|---|
| Accept | 0 | | 0 | 0 | 1000 | |
| Reject | 0 | | 0 | 0 | 15 | |
| Total | 0 | | 0 | 0 | 1015 | |

Reset Total  800    Reset Totals ▷

Part Type #1

Parts

| | Reset Reject | Year | Month | Reset Day | Shift |
|---|---|---|---|---|---|
| Accept | 0 | | 0 | 0 | 200 |
| Reset Reject | 0 | | | | 1 |
| Total | 0 | | 0 | 0 | 201 |

Reset Total  50000000

Cancel Reset    Confirm Reset

| Station Overview | Part Counter | Cycle Time | | | | Main Screen |
|---|---|---|---|---|---|---|

Navigation Bar

*Fig-5*

SYSTEM AND METHOD FOR CONTROLLING A PROCESS LINE USING A PLC AND SCALABLE HMI CONTROL TEMPLATE

CROSS-REFERENCE TO RELATED APPLICATIONS

This application claims the benefit of U.S. Provisional Patent Application No. 62/214,620 filed on Sep. 4, 2015, the disclosure of which is hereby incorporated by reference in its entirety.

TECHNICAL FIELD

The present disclosure relates to a system and a method for controlling a process line using a PLC and a scalable HMI control template.

BACKGROUND

A programmable logic controller (PLC) is an industrial computer control system that is used to monitor states of a set of input devices, e.g., sensors, switches, or pushbuttons, and to ultimately control the state of various valves, motors, solenoids, pumps, relays, actuators, or other output devices. A typical PLC includes a central processing unit (CPU) and computer-readable code instructing hardware elements of the PLC how to perform motion control functions such as input state detection, program execution for the various controlled workstations, control of the output devices, and communication with networked devices. Languages such as a Ladder Logic, Structured Text, or low-level assembler languages can be used in overall PLC control.

A human-machine interface (HMI) device facilitates direct interaction between a machine and a human operator. An HMI control template provided by the PLC provides intuitive menu-drive and/or icon-driven access to process operations via display screens of multiple HMI devices networked to the PLC. In manufacturing environments in particular, HMI devices are typically embodied as touch-screen panels that interface with one or more PLCs. HMI devices are used to monitor the status of and/or control one or more process workstations. For example, an HMI device may be networked to a workstation and used to control individual actuators for that particular workstation, e.g., automated conveyor systems, electric motors, solenoid devices, hydraulic lifts or presses, and/or pneumatic torque wrenches. While HMI devices are widely used in industry, conventional HMI control templates and the integration of such templates within a process environment remain less than optimal, particularly in terms of dynamic adaptability and memory utilization.

SUMMARY

A control system is disclosed herein that includes a programmable logic controller (PLC) providing networked human-machine interface (HMI) devices with an individually-scalable HMI control template. The PLC is configured to address memory use and flexibility limitations of conventional off-the-shelf approaches in the manner set forth herein. For instance, approximately 70% of available PLC memory is typically dedicated to providing a static HMI template to all networked HMI devices. This can greatly limit the range of possible control and monitoring functions performed by a given HMI device, and/or can require additional HMI devices to be used for a desired level of control functionality.

Additionally, in conventional HMI template/PLC configurations, when additional control or monitoring functions are required by any one of the various HMI devices, this need is typically addressed via time-intensive programming of and code compilation by the particular HMI device needing the additional functions. The present approach, which makes real-time calculations and dynamically shifts data between the PLC and HMI devices as needed, adjusts and individually displays available control screens and associated functions for each HMI device. Thus, the disclosed control system and method are intended to reduce overall PLC memory usage and potentially increase the range of available control functions that are assigned to a given one of the HMI devices.

The control system and method described herein are to be used with a process line having multiple process workstations, i.e., stations or locations at which automated or assisted process steps are to be performed. Each workstation has one or more controllable output devices. The PLC is configured to output control signals to the various workstations in response to input signals, e.g., from the HMI devices, sensors, and/or other input devices, and to thereby control operation of the process line.

The PLC is programmed with selectable control functions needed for controlling operation of the process line. Specifically, the PLC is programmed with a plurality of control modules, i.e., software and requisite hardware sufficient for providing the disclosed functionality. The individual control modules provide access, via each/all of the networked HMI devices, to a shared set of the control functions, including sign-of-life, cycle type/mode, and home position control functions as are known in the art and described herein. Each HMI device thus has access to this shared set of control functions.

Additionally, each networked HMI device is also selectively and dynamically provided access, via the PLC, to additional designated control functions. The designated control functions may differ between the HMI devices. That is, the particular designated control functions accessed and controlled by a given HMI device is individually and dynamically assigned by the PLC based on the identity of the workstation and/or the control or monitoring tasks being requested by the HMI device, with a particular data screen numbering and embedded data structure of the PLC enabling such dynamic assignment.

In an example embodiment, a method for controlling a process line with a PLC programmed with a plurality of control screens each having a unique screen number includes providing access via each of the HMI devices to a first set of the control screens, including displaying buttons labeled with a corresponding one of the control screens via a respective one of the display screens. The method also includes receiving input signals from a requesting one of the HMI devices ("the requesting HMI device") that identifies the requesting HMI device and requests a control action or a monitoring action for a corresponding one of the workstations.

Additionally, the method includes providing the requesting HMI device with access to a second set of the control screens based on the received input signals, such that the HMI all devices share an HMI control template that is dynamically and individually scalable to the requesting HMI device. The process line is then controlled via the PLC in response to control signals from the HMI devices corresponding to selections from the first and second sets of control screens.

A control system is also disclosed for use with a process line having a plurality of workstations and a plurality of the HMI devices. The control system may include sensors operable for measuring or detecting a state of a device used in a corresponding one of the workstations, actuators responsive to control signals, and the PLC. The PLC is operable for outputting the control signals to the actuators in response to input signals from the HMI devices and the sensors to thereby control operation of the process line, and is configured as set forth above.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

FIGS. 2-5 are schematic illustrations of example dynamic HMI device screens usable as part of the system shown in FIG. 1.

DETAILED DESCRIPTION

Figure 1:
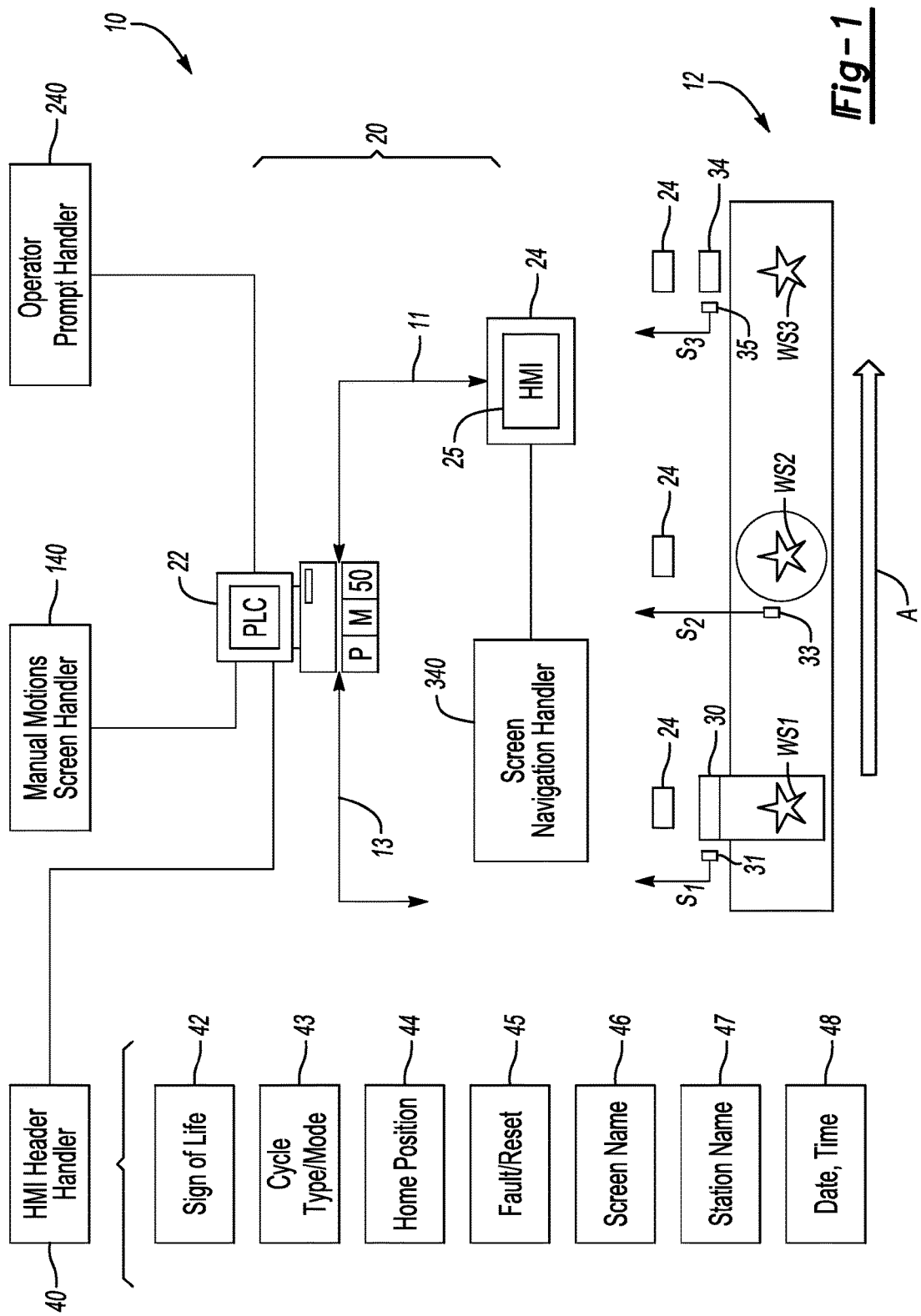
FIG. 1 is a schematic illustration of an example system having a programmable logic controller (PLC) and multiple process workstations controlled via a respective human-machine interface (HMI) device or multiple such devices, each provided by the PLC with a scalable HMI control template as disclosed herein.

Referring to the Figures, wherein like numerals indicate like parts throughout the several views, an example process line 10 is shown schematically in FIG. 1. The process line 10 is controlled via a control system 20. The control system 20 includes a programmable logic controller (PLC) 22 in networked communication with multiple networked human-machine interface (HMI) devices 24, each of the latter having a corresponding display screen 25. The control system 20, via the PLC 22, employs a dynamically-scalable HMI control template as described below with reference to FIGS. 2-7 in a manner intended to improve overall memory usage of the PLC 22 and control flexibility relative to conventional static HMI template approaches.

The PLC 22 is programmed with an algorithm, embodied as a method 100, for dynamically and individually controlling and displaying selectable control screens and corresponding functions for controlling operation of the process line 10. Such control is provided in response to input signals, including input signals (arrow 11) from selection of a given control function via the HMI devices 24 and other control signals, e.g., sensor signals ($S_1$, $S_2$, and $S_3$) as explained below. Various control screens are described below with reference to FIGS. 2-5, with the improved memory utilization within the PLC 22 provided via certain dynamic assignment and reconfiguration of the various control screens as set forth below with additional reference to FIGS. 5A-7.

The PLC 22 of FIG. 1 is programmed with a plurality of handler modules, shown generally at 40, 140, and 240, i.e., an HMI Header Handler, a Manual Motions Screen Handler, and an Operator Prompt Handler, respectively, which collectively provide access, at each/all of the HMI devices 24, to a predetermined shared set of control functions. The shared set of control functions includes, for instance, a Sign-of-Life function 42, a cycle type/mode function 43, a home position control function 44, a fault/reset function 45, a screen name function 46, a station name function 47, and a date/time function 48 as shown and explained below with additional reference to FIGS. 2-5.

Each HMI device 24 is programmed with or provided by the PLC 22 with access to an additional control module 340 in the form of a Screen Navigation Handler providing dynamic access to an individually-assigned designated control functions for a respective workstation WS1, WS2, or WS3. Thus, every HMI device 24 has access to the shared set of control functions in a manner similar to conventional static HMI templates, while the identity of a given HMI device 24 and control or monitoring selections initiated at the given HMI device 24 allows the PLC 22 to dynamically assign additional designated control functions as set forth below with particular reference to FIGS. 5A-7.

For illustrative simplicity, the process line 10 of FIG. 1 is shown having three schematic workstations WS1, WS2, and WS3. However, those of ordinary skill in the art will appreciate that a typical process line 10 may include any number of workstations, which may bend or curve through a process facility over an extended distance. As such, a given workstation may not be visible from the vantage point of another workstation. Therefore, each workstation WS1, WS2, and WS3 depicted in FIG. 1 may have a corresponding HMI device 24 that is configured as set forth below.

As noted above, the control system 20 is intended to provide certain performance advantages. It is recognized herein as a basis for the present disclosure that existing HMI software and underlying PLC logic can be notoriously challenging to write and effectively integrate into a given process or facility. Conventional off-the-shelf PLC control software packages typically use a static HMI template which can be programming, memory, and processing-power intensive to customize to a given HMI device 24. Additionally, the limited scalability of such packages can inadequately reflect the unique needs of a given process or workstation within such a process. The PLC 22 of the present disclosure is therefore configured to address this significant memory use and scalability limitation.

Conventional static HMI control templates support a relatively small fixed number of operational motions or tasks, e.g., 64 separate motions or tasks. The static number of motions or tasks are then hard-coded into off-the-shelf HMI and/or PLC software, thereby tying up valuable memory and other computer resources regardless of whether or not a given process or workstation actually uses the provided motions or tasks. Information is not optimally provided to conventional HMI devices or restricted at the point of use. Additionally, the motions or tasks defining a given process are ordinarily accessible from all networked HMI devices used for controlling that particular process. These and other potential control problems are also addressed via the presently disclosed approach.

The schematic process line 10 of FIG. 1 is depicted as a non-limiting example manufacturing line or assembly having a variety of different automated equipment needed for completing a given work task, e.g., the progressive assembly of a product. The process line 10 may include, for instance, an automated conveyor belt 12 that moves a work piece in a particular direction (arrow A) through the workstations WS1, WS2, and WS3, with the workstations WS1, WS2, and WS3 indicated in FIG. 1 via a star for added clarity. Work may temporarily stop at each workstation WS1, WS2, and WS3, and thus motion of the conveyor belt 12 is potentially intermittent, and is closely controlled, e.g., via operation of motors, pulleys, and gears (not shown). Each workstation WS1, WS2, and WS3 may have different assigned control functions, and thus a different corresponding piece of automated equipment. For example, the workstation WS1 may include an overhead lift apparatus 30, workstation WS2 may include a turn table 32 which rotates the work piece, and workstation WS3 may include an RFID/barcode scanner 34 or other tracking device.

The PLC 22, as is known in the art, continuously measures or detects and thus monitors the states of input devices used in the various workstations WS1, WS2, WS3, such as the sensors 31, 33, and 35 of FIG. 1 providing input signals $S_1$, $S_2$, and $S_3$, or pressures, switch positions, etc., and makes decisions based upon logic to control the state of the output devices in the process line 10, e.g., actuators, motors, relays, solenoids, etc. The PLC 22 generates output signals (arrow 13) to control output states of the various actuators used in the process line 10, as is well known in the art. The PLC 22 therefore includes a processor (P) and memory (M) on which is recorded instructions embodying a method 100 for controlling the process line 10 via the control system 20.

The PLC 22 includes the necessary hardware for performing the required steps, i.e., the memory (M) and processor (P), as well as other hardware such as a high-speed clock or digital counter, analog-to-digital and/or digital-to-analog circuitry, a timer, input/output circuitry and associated devices such as a transceiver, signal conditioning and/or signal buffering circuitry. The memory (M) includes sufficient tangible, non-transitory memory such as magnetic or optical read-only memory, flash memory, etc., as well as random access memory, electrically erasable programmable read only memory, and the like. Each HMI device 24 may be embodied as a suitable graphical user interface, e.g., a color touch-sensitive input device having a touch-sensitive display screen 25.

The PLC 22 may be programmed using Ladder Logic and Statement List (STL), i.e., a high-level structured programming language as is known in the art, to provide the functionality of the logic modules 40, 140, 240, and 340 via a set of HMI management code embodying the method 100. The logic modules 40, 140, and 240 may be hosted on the PLC 22 while the logic module 340 may be hosted on the HMI devices 24. Such a configuration allows for unique programming/assignment of different configurable variables or control options at each HMI device 24, as opposed to having all available functions being available on all networked HMI devices 24 in the conventional manner. Thus, predetermined motion groups or tasks can be uniquely predefined for each HMI device 24 used in the process line 10 and be readily accessible by that particular HMI device 24, with dynamic pointers used by the PLC 22 to assign the required functions to the various HMI devices 24. Selection by an operator via one of the HMI devices 24 of a control options or function generates the input signals (arrow 11) shown in FIG. 1.

Figure 2:
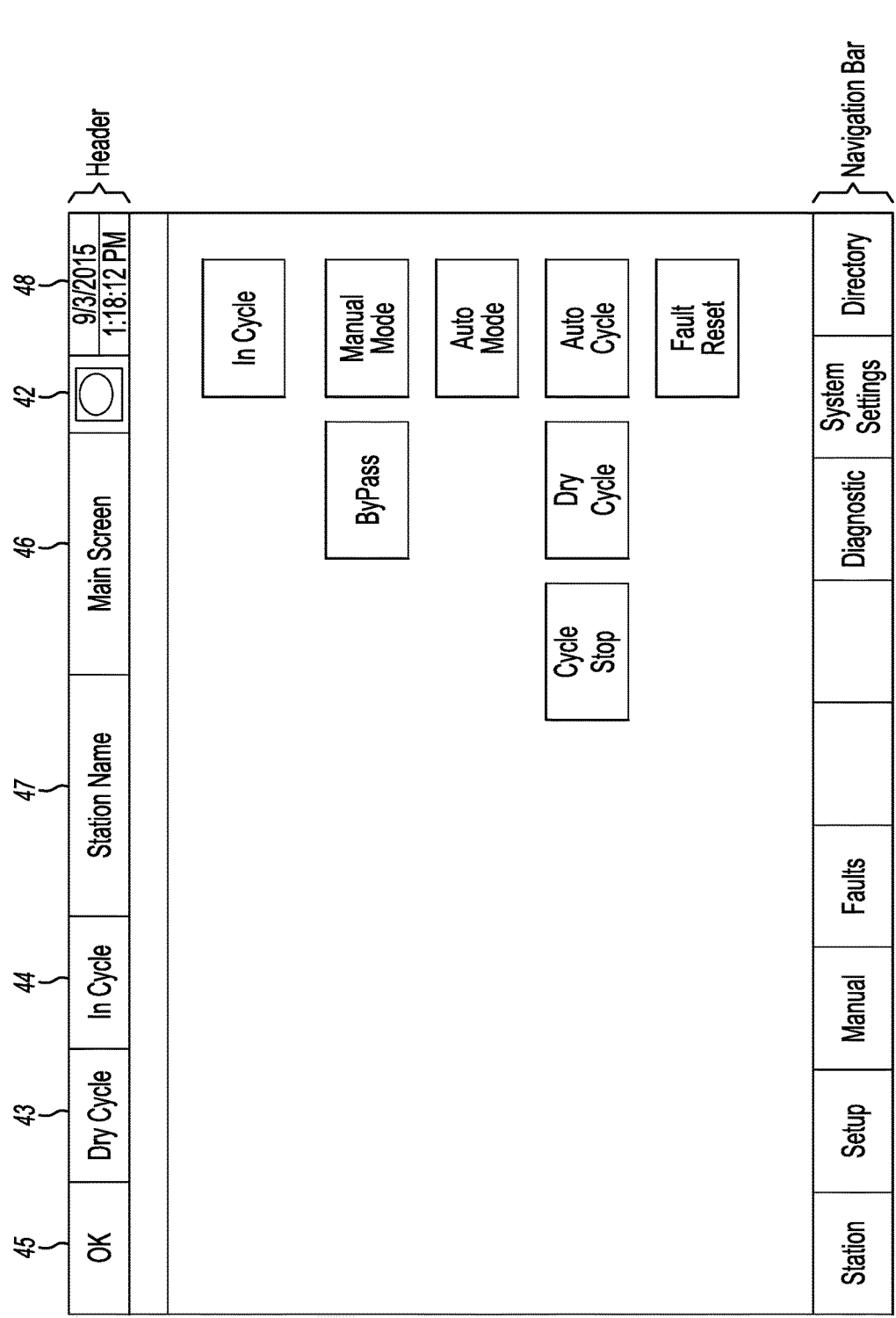

Referring to FIG. 2, which depicts a "Main Screen" as indicated by the bold outline of button 46, this Figure depicts a plurality of possible control and monitoring screens accessible via the HMI device 24. The HMI header handler module 40 of FIG. 1 is configured to provide common header ("Header") functionality, i.e., functionality that is shared in common by all networked HMI devices 24. The header handler module 40 of FIG. 1 may provide control functions in common to each control screen accessible by the HMI devices 24, such as by displaying user-selectable buttons corresponding to each of the functions 42-48 described above.

Of these control functions 42-48, shown with labels corresponding to a selected function available under a category shown on the buttons numbered 42-48 of FIG. 1, and unlike conventional fixed HMI templates, the Sign-of-Life function displayed at button 42 in FIG. 2, e.g., as a background color to an icon or logo, continuously displays the current status of communications of a given HMI device 24 with the PLC 22 and performs control actions in the event of a loss of communication between the two. Thus, PLC 22 of FIG. 1 may control a color of the Sign-of-Life function 42 displayed via the main screen of FIG. 2 to indicate the communications status at a glance.

For instance, a typical PLC 22 has a digital counter with a calibrated clock cycle of 1.6 seconds. The HMI device 24 may scan or monitor communications channels between the HMI device 24 and the PLC 22 every second, e.g., via a known handshake process, or at a shorter scanning interval than that of the clock cycle of the PLC 22. Such a scan is referred to herein as an HMI scan. These results are then displayed, e.g., as a blinking and/or color-coded/green indicator on button 42 of FIG. 2 if the HMI device 24 remains connected to the PLC 22, or as a solid red indicator otherwise.

If communication is interrupted during a given HMI scan, an HMI device 24 of a conventional control system will ordinarily continue to function as if active communications remain ongoing, and therefore will continue to calculate internal control values, thereby potentially accumulating error and uncertainty. While a loss of communications in such conventional systems may be visually indicated, the indication may be provided without also affecting or zeroing underlying values that are being measured or controlled. In the Sign-of-Life function of button 42 in the present approach, by way of contrast, if at the end of an HMI scan it is determined that communications with the PLC 22 are not active/ongoing, i.e., have been interrupted, the HMI device 24 increments or PLC 22 increments a counter and scans again. If communications are detected in the next HMI scan, the counter is automatically reset. A fault is indicated only when the loss of communications persists for a calibrated number of HMI scans, e.g., five scans, with a control signal generated by the HMI device 24 or the PLC 22 as a result of the failure, including possibly resetting control values for the monitored functions or tasks in the PLC 22 and/or HMI device 24.

The cycle type/mode function of button 43, shown in FIG. 2 as a selected mode function of "Dry Cycle", may include an indicator button that is color-coded for the particular cycle type. This option allows an operator to navigate directly to a cycle type control screen. The home position selection function 44, labeled "In Cycle", which like the cycle type/mode 43 typically does not exist in conventional templates, indicates whether a given workstation WS1, WS2, or WS3 is at a calibrated home position. As is known in the art, automated processes may be controlled via position tracking over time, with movement tracked relative to a known reference point. The home position is therefore a calibrated known reference or zero position to which a given piece of equipment can return when its position becomes uncertain or conditions otherwise dictate that a return to the home position is warranted. Touching a "Home Position" button corresponding to the function of button 44, labeled "In Cycle" in FIG. 2, allows equipment at a given workstation to move to a designated home position without the need for an operator to visit another control screen. In other words, any screen presented via the HMI device 24 allows an operator to visit the home position.

Referring again to FIG. 1, the manual motions screen handler module 140 is triggered only when a Manual Motions screen (FIG. 4) is displayed via the HMI device 24. This option enables dynamic allocation of displayed rows, text, and timers for a given selected manual motion function, for a given HMI device 24, such as lifting and locating a work piece. Such a screen handler module 140 also allows for multiplexing between different HMI devices 24 that are used to control the same workstations or zone in a given process. The operator prompt screen handler module 240 is intended to display text or other messages to an operator, doing so via the touch screen 25. Such text can change with the particular information being conveyed.

Within each HMI device 24, the screen navigation handler module 340 provides additional HMI-specific functionality via a calibrated second set of control functions. Module 340 essentially provides automatic screen navigation control by individually-assigning control screen numbers and associated control functions to each HMI device 24. Thus, an operator accessing a given HMI device 24, such as that shown at workstation WS1 of FIG. 1, is presented with a different set of buttons and allowed functions relative to an operator working at the HMI device 24 of workstations WS2 or WS3.

To achieve these desired ends, the PLC 22 implements a screen numbering data structure in which all possible control screens to be displayed by the HMI devices 24 are assigned a unique screen number. Screen numbers may be designated in increments of 10, e.g., 0, 10, 20, 30, etc., with groups of screens arranged into categories designated in increments of 100, e.g., 100, 200, 300, 400, etc. Each button of a Navigation Bar shown at the bottom of FIG. 2 can hold an increment of a screen number, e.g., "Station", "Setup", "Manual", "Faults", "Diagnostic", "System Settings", Directory", etc.

In general, as detailed further below, the control system 20 has two locations at which an operator can interface with the process 10: the PLC 22 and any of the HMI devices 24. When an operator is not requesting control of a motion or operation of the process 10, but rather is concerned only with viewing status information, the PLC 22 copies or moves all necessary data for the given status monitoring function from the PLC 22 to the HMI device 24. Conversely, such data may be copied from the HMI device 24 over to the PLC 22 when control of one or more motions of the process 10 is required via the HMI device 24. A possible embedded data structure suitable for achieving some of these ends will be further described below with reference to FIGS. 5A-7.

The PLC 22 of FIG. 1 may be individually programmed with a predetermined set of assigned numbers corresponding to control screens displaying designated control functions, with individual screens displayed at a given HMI device 24 determined dynamically by the PLC 22 as set forth below. By way of example, "overview" screens maybe assigned numbers 1001-1100, screen numbers 1101-1120 may be "part counter" screens such as that shown in FIG. 5, and so forth. Moreover, only predetermined functions are displayed via each of the numbered screens for a particular one of the HMI devices 24. For instance, one of the HMI devices 24 may be programmed with dynamic pointers to a predetermined set of assigned control or monitoring functions and associated screens, thereby quickly and easily steering a given HMI device 24 only to the designated set of assigned functions.

This is unlike conventional HMI templates which are ordinarily programmed to provide access to all programmed functions at all networked HMI devices, usually at least 64 different functions. Thus, if a given workstation requires only five functions, e.g., control is required of five motions, the HMI device 24 is programmed so as to point only to those five functions or motions that are needed. As a result, a given HMI device 24 is fully scalable as to the number of displayed and accessible functions, which can be as few as one or as many as provided by the present software structure, i.e., 200 or more functions.

The above-described functionality and structure of the present control system 20 is further described via example screens of FIGS. 2-5. FIG. 2 depicts an example Main Screen having a Header as shown. In the presently disclosed control system 20, the Header is presented on every displayed screen. This allows an operator to perform at least the following set of common control and monitoring functions from any screen: resetting of any detected faults, cycle type selection, movement of any or all station devices to a default home position, and indication of the current PLC 22—HMI device 24 communication status. The latter is shown in FIG. 1 as "Sign-of-Life" function via button 42 with a back-lit or illuminated logo or icon. A Navigation Bar shown at the bottom of the screen may be used for any number of designated control or monitoring functions permitted for the HMI device 24 such as station selection, setup, manual mode selection, fault display, diagnostics, system setting, and a directory screen. The functions displayed between the header and Navigation Bar correspond to the designated control functions for the selected screen, e.g., In Cycle, ByPass, Manual Mode, Auto Mode, Auto Cycle, Cycle Stop, Dry Cycle, and Fault Reset, i.e., functions understood in the general art of PLC/HMI control.

Figure 3:
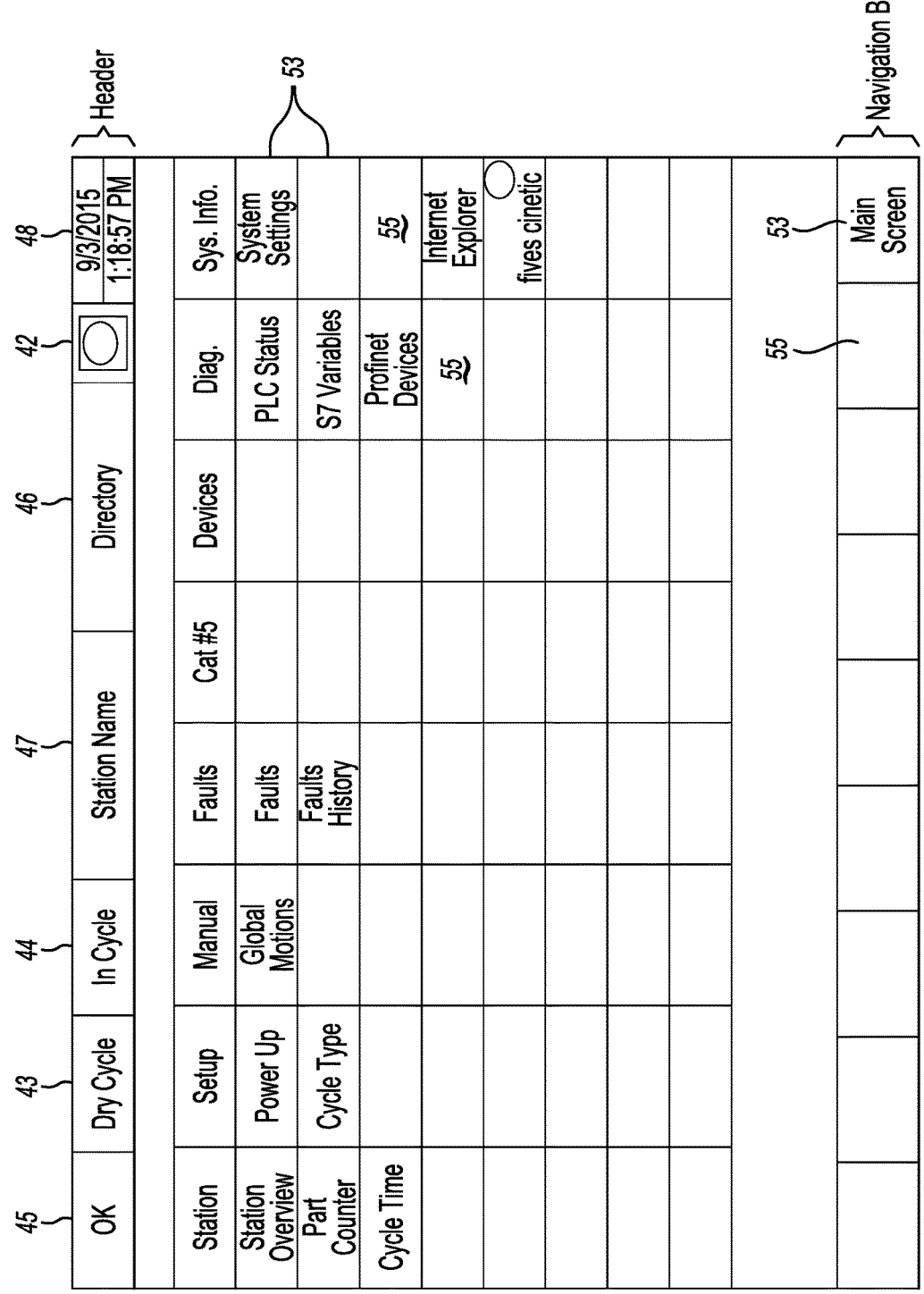

FIG. 3 depicts an example of a possible Directory Screen. When selected in the Navigation Bar of FIG. 2, the Directory Screen displays selectable buttons 53 with a label corresponding to only the control screens permitted for access by a particular HMI device 24. Thus, control screens determined by the PLCC 22 as not accessible for a given HMI device 24 may be ghosted or blanked out, e.g., as blank buttons 55, with the same blank buttons 55 possibly having assigned screens on a different HMI device 24. Using the method 100 explained below, with its corresponding programmed data structure enabling dynamic assignment of different screens and control functions to the various HMI devices 24, the control functions depicted on the buttons 53 dynamically change depending on the identity of the HMI device 24 and the functional selections made thereon, i.e., whether the requesting HMI device 24 requests a control action or merely status information. That is, the designated control functions displayed on the various buttons 53 of FIG. 3 are dynamically controlled and populated for a given HMI device 24 by the PLC 22 based on the selections made by the requesting HMI device 24. This approach avoids the need to individually program each networked HMI device 24 with designated control functions.

FIG. 4 depicts an example Manual Motions screen showing control motions permitted for a particular HMI device 24. Such a screen may be reached from FIG. 3, for example, by touching the "Global Motions" button 53 under the "Manual" column. As is well known in the art, workstations may have an "automatic mode" for certain tasks that are automatically performed, e.g., RFID tracking. Thus, a manual mode refers to any manually-assisted or manually-performed work tasks such as assisted movement of a conveyor belt ("Conveyors"), lifting and locating an object with the assistance of a hoist or other device ("Lift & Locate"), or other motions ("Motion1"). While the provided functions of the screen shown in FIG. 4 are typical of conventional HMI templates, the method 100 enables a significant reduction of memory usage of the PLC 22 for controlling and displaying such a screen. As with other screens, the remainder of FIG. 4 depicts functions such as "Page Up", "Page Down", "Symbol Absolute", etc., that are conventional in operation but different in the manner they are controlled, as set forth herein.

FIG. 5 depicts an example "Part Counter" screen, a button 53 for which is depicted in FIG. 3. This particular screen can be used to track and provide an ability to reset a production counter, e.g., year/month/day/shift/station/and part type. These and other example screens may be used within the intended inventive scope in conjunction with the scalable control of the individual HMI devices 24. The data structure underlying the method 100 thus allows the example screen of FIG. 5 to be used with a significant reduction in memory usage of the PLC 22. As depicted, the screen of FIG. 5 allows for part count totals, reset options, month, day, and shift counts, statistical information such as parts accepted, parts rejected, etc.

Figure 5A:
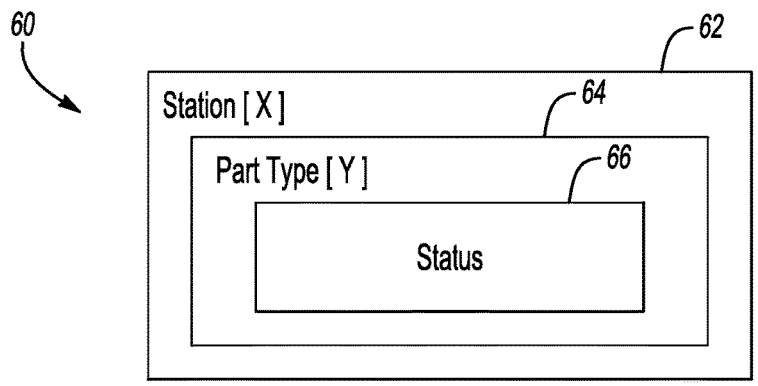
FIG. 5A is a schematic data structure describing a data block of the example part counter screen shown in FIG. 5.

The above screens are dynamically allocated and controlled via the PLC 22 using a specific data structure. Referring to FIG. 5A, a problem in the relevant art of PLCs/HMIs is the difficulty of handling data for large numbers of part types handled on multiple workstations. The PLC 22 of FIG. 1 solves this problem via a data structure array 60 that embeds a data structure [Y] 64 inside of an array [X] 62. Array [X] 62 may be, by way of example, a parts count per station, with the structure [Y] 64 being a part type. The data structure array 60, which embeds the structure [Y] 64 inside of data array [X] 62 as shown, thus allows a status 66 to be displayed for each part type, e.g., Part Type #1 as shown in FIG. 5. Such a data structure allows the capability of high-level data base management introduced into a PLC environment, more tracking and statistics management within the PLC 22, and opens the capability of statistical analysis and decision making within the PLC 22. This approach also provides for a more optimal use of the available memory (M) of the PLC 22 of FIG. 1.

Figure 6:
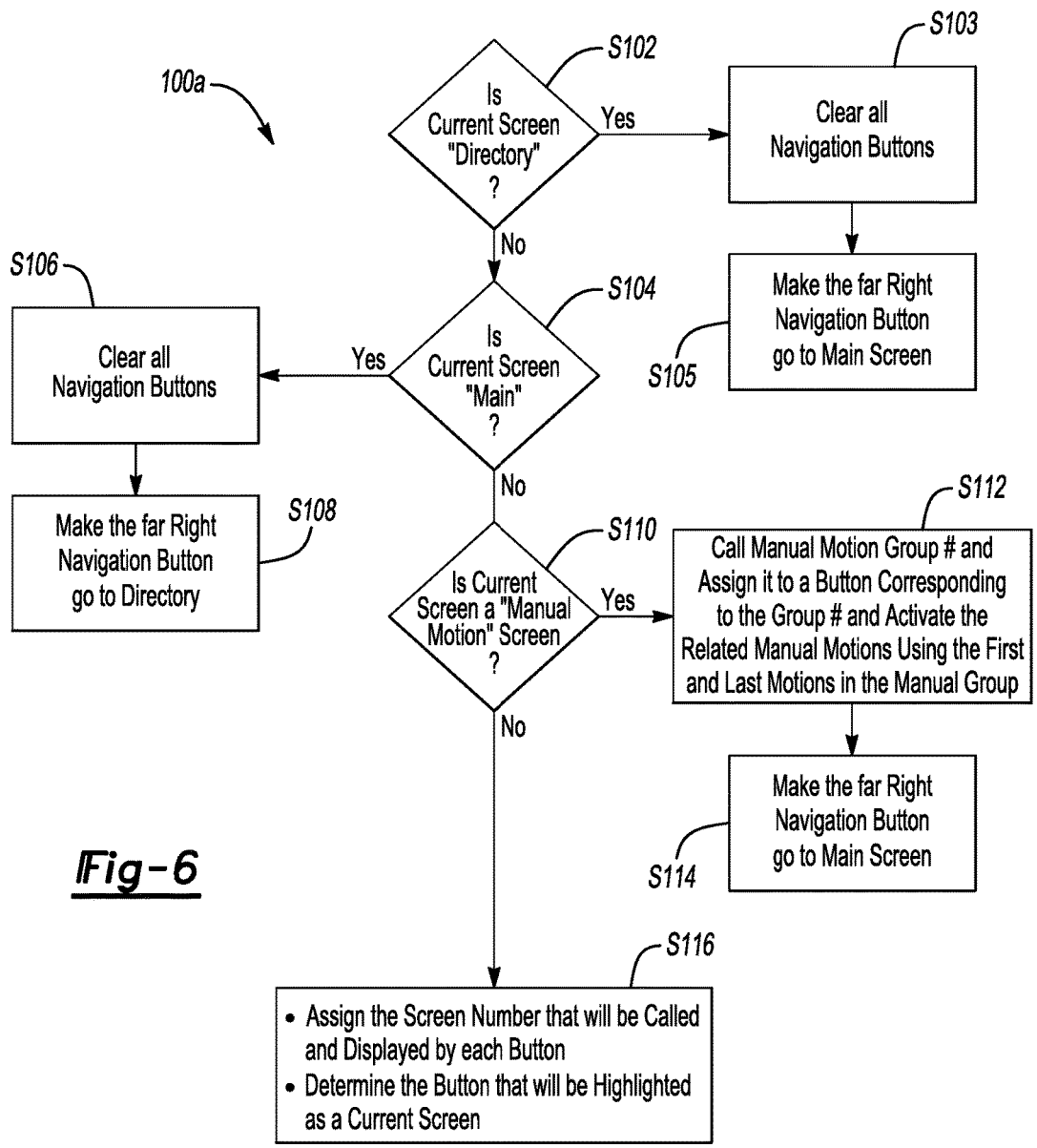
FIGS. 6 and 7 are flow charts describing an example embodiment of an algorithm usable by the PLC of FIG. 1 to provide the scalable HMI control template, dynamically associated functionality, and memory usage benefits as disclosed herein.
Figure 7:
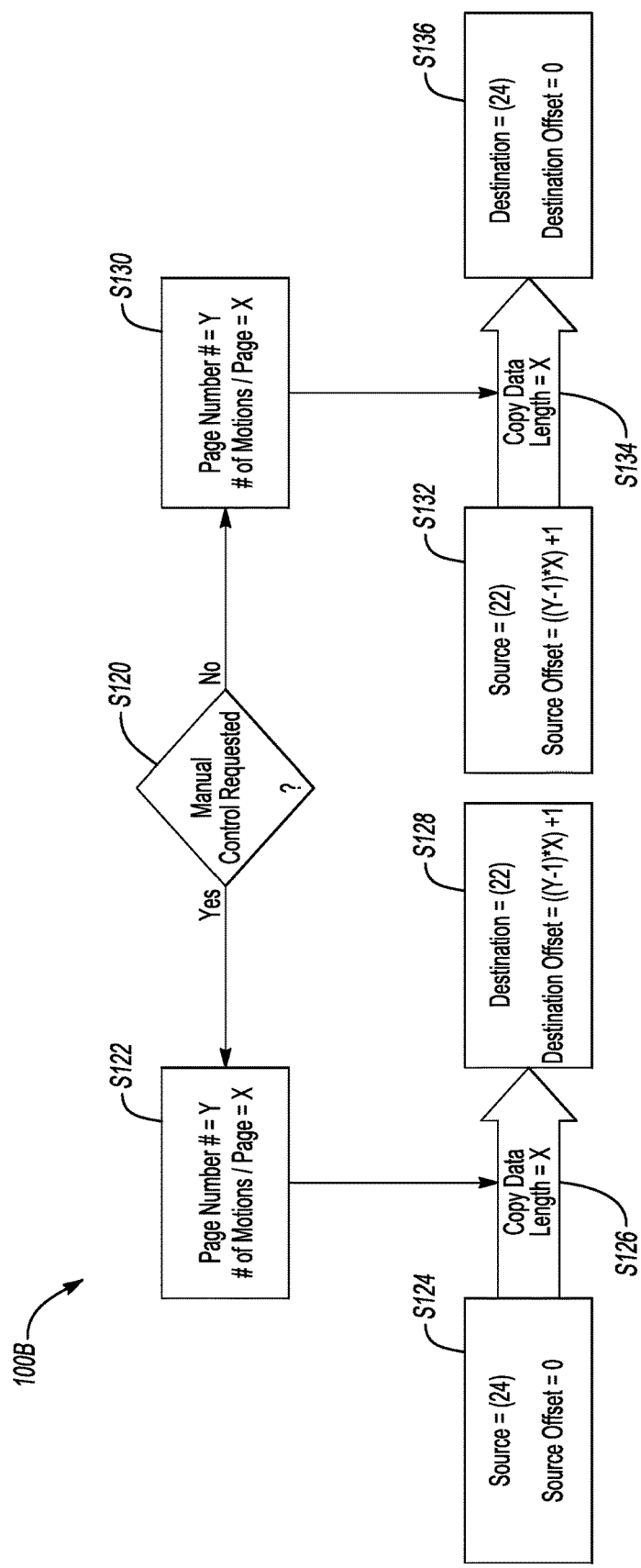

FIGS. 6 and 7 described an underlying algorithm embodying the method 100 noted above and enabling optimal use of the embedded data structure of FIG. 5A. In executing the method 100, as noted above, which is described with reference to sub-methods 100A and 100B of FIGS. 6 and 7, respectively, the PLC 22 numbers all screens of a given assigned category, e.g., in increments of 10, with the categories in turn having larger increments, such as increments of 100. Each button 53 in the Navigation Bar shown in FIGS. 2-5 can hold an increment of a screen number.

In general terms, the method 100 disclosed herein provides an approach for controlling the process line 10 of FIG. 1, i.e., having a plurality of workstations SWS1, WS2, WS3. The method 100 includes configuring or providing the PLC 22 with a plurality of control screens each having a unique screen number, e.g., in increments of 10, and providing access via each of the HMI devices 24 to a first set of the control screens, i.e., by displaying buttons labeled with a corresponding one of the control screens. The method 100 also includes receiving input signals (arrow 11) from a requesting one of the HMI devices 24 that identifies the requesting HMI device 24, such as by station number or device number, and requests a control action or a monitoring action for a corresponding one of the workstations.

The PLC 22 then provides the requesting HMI device 24 with access to a second set of the control screens based on the received input signals (arrow 11), such that the HMI devices 24 in FIG. 1 all share an HMI control template that is dynamically and individually scalable to the requesting HMI device(s). Thereafter, the PLC 22 controls the process line 10 in response to control signals from the HMI devices 24 corresponding to selections from the first and second sets of control screens.

In a particular example embodiment, starting with step S102, the PLC 22 of FIG. 1 determines if a selected current screen is the Directory Screen of FIG. 3. If so, the sub-method 100A proceeds to step S103. Otherwise, the sub-method 100A proceeds to step S104.

Step S103 includes clearing all of the navigation buttons 53 for a given HMI device 24, via a command from the PLC 22, and then proceeding to step S105.

At step S104, the PLC 22 determines whether the current selected screen is the Main Screen of FIG. 2. If so, the sub-method 100A proceeds to step S106. The sub-method 100A otherwise proceeds to step S110.

Step S105 includes setting the button 53 located to the far right of the Navigation Bar of FIG. 3 to point to the Main Screen.

At step S106, the PLC 22 displays all available "X100" buttons, as shown on the Directory Screen of FIG. 3, on the Navigation Bar of the Main Screen of FIG. 2. The term "available" used above refers to the selective display of only some control functions for a given HMI device 24. For example, FIG. 3 shows an example in which an HMI device 24 does not have access to functions "Cat #5" and "Devices", with such functions or motions blanked out in FIG. 3. Thus, at step S106 the PLC 22 does not display those functions or motions on the Directory Screen of FIG. 3. The sub-method 100A then proceeds to step S108.

Step S108 includes setting the far right button 53 of the Navigation Bar of FIG. 3 to point to the Directory Screen.

Step S110 includes determining if the current screen is a Manual Motion screen, i.e., FIG. 4. The method 100 proceeds to step S112 when the current screen is a Manual Motion screen. Otherwise, the sub-method 100A proceeds to step S116.

At step S112, the PLC 22 of FIG. 1 assigns a motion group number for the motion group controlled by the particular HMI device 24 whose interface is being controlled to it a button 53 corresponding to that particular group number. The PLC 22 then activates the assigned motions using the first and last motions in the manual group.

As part of step S112, the PLC 22 separates display data structure and functional data structure of all motions performed at a given workstation. The PLC 22 may do this by dynamically connecting a number of such motions to the same number of displayed statuses and control structure. This provides at least double the number of possible control motions with a substantial reduction in the memory resources of the PLC 22 typically dedicated to such Manual Motion screens. Thus, the PLC 22 uses a mapping function that uses a page number as a base number to which to map the various control functions. The sub-method 100A then proceeds to step S114.

Step S114 includes setting the far right button 53 of the Navigation Bar of FIG. 4 to point to the Main Screen.

Step S116, which is reached from step S110 when the current screen is not a Manual Motion screen, includes assigning, via the PLC 22, a screen number that will be called and displayed by the respective buttons 53 of the HMI device 24. That is, depending on the screen and the identity of the HMI device 24, the PLC 22 determines which button to highlight as a current screen.

Referring FIG. 7, a Manual Motions management function is described in further detail with reference to a sub-method 100B executed by the PLC 22 of FIG. 1 to achieve some of the Manual Motions control steps described above with reference to FIG. 6. Thus, FIG. 7 is intended to provide further detail to step S112 of FIG. 6. As will be appreciated by one of ordinary skill in the art, FIG. 7 provides a process for separating the data structure displayed via a given HMI device 24 from a functional data structure related to the controlled motions. The steps of FIG. 7 dynamically connect, via operation of the PLC 22 of FIG. 1, a fixed number of displayed motion statuses and control structures to any number of consecutive motions. The display mapping function uses the page number as a base number for mapping all motion controls to a given HMI device 24.

Step S120 includes determining if Manual Motion control is requested, i.e., via detection of a selected button 53 from one of the various screens shown in FIGS. 2-5. Step S122 is executed if Manual Motion control is requested, with step S130 executed in the alternative.

Step S122 includes designating the page number as variable [Y] and the number of permitted motions per page as variable [X], with the variables [X] and [Y] unrelated to the variables used in FIG. 5A. The sub-method 100B then proceeds to step S 124.

Step S124 includes designating a data source as being the HMI device 24, i.e., the display structure, and designating a source offset to zero. As noted above, the approach disclosed herein has two locations for interfacing with the process 10 of FIG. 1, i.e., the PLC 22 and the HMI devices 24, with the latter being the display structure. Display structure only has one page structure, so for the HMI devices 24, the offset is always set to zero, with offset=0 effectively forming a data pointer to a first page, offset=1 pointing to a second page, and so on. The sub-method 100B then proceeds to step S126.

At step S126, the PLC 22 copies the data of length (x) from the HMI device 24 to the PLC 22, and then proceeds to step S128. In other words, as the decision was made at step S120 that manual control is needed, any associated data with the particular control screen being viewed by the HMI device 24 is copied over to the PLC 22 for the control operation.

Step S128 includes designating the destination as the control structure, i.e., the PLC 22, and then modifying the source offset using the formula:

Source Offset=$((Y-1)*X)+1$

That is, given Y=page number 2, and X=5 possible control motions per page, the source offset would be $((2-1)*5)+1=6$. This means that the PLC 22 is directed to connect the motion controls data structure starting at motion number 6 to the displayed motion controls on the HMI device 24. In this illustrative example, the method 100 will allow an operator to trigger the five possible motion controls starting at motion number 6 and continuing to motion number 10.

At step S130, the PLC 22 executes a step that is analogous to step S122, i.e., the page number is designated as variable [Y] and the number of permitted motions per page is designated as variable [X]. The sub-method 100B then proceeds to step S132.

Step S132 includes performing the opposite operation to that of step S128, i.e., designating the source of the data as the control structure, which is the PLC 22. This step is performed in preparation for copying the data back to the HMI device 24 in response to the decision at step S120 that manual motion control is not required. At step S132, the PLC 22 sets the source offset in the same way the destination offset was set at step S128:

Source Offset=$((Y-1)*X)+1$

The sub-process 100A then proceeds to step S134. This step will allow the operator to view the instantaneous status of the viewed motions.

Step S134 is analogous to step S124, but occurs in reverse, i.e., the PLC 22 copies the data of length (x) to the HMI device 24. In other words, as the decision was made at step S120 that manual control is not needed, any associated data with the particular control screen being viewed by the HMI device 24 is copied over to the HMI device 24 to reside in memory of the HMI device 24, thus freeing up memory of the PLC 22 to perform other control operations.

Step S136 entails performing the opposite control action as step S124. That is, in order to arrive at step S136, an operator must request a status at step S120, meaning that a manual motion control operation was not requested. Thus, step S136 designates the destination as the HMI device 24 and sets the destination offset to zero.

Using the control system 20 described above, certain performance advantages may be enjoyed relative to using conventional OTS HMI templates. By using a fully configurable HMI template, e.g., with dynamic pointers and HMI-unique assigned screens and functions, with restricted access by each HMI device 24 to a predetermined set of possible control functions, the required programming, memory usage, and processing-power is greatly minimized relative to OTS designs. Additionally, the unique needs of a given process or workstation within a process are satisfied.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A method for controlling a process line having a plurality of workstations using a programmable logic controller (PLC) programmed with a plurality of control screens each having a unique screen number, wherein the PLC has a calibrated clock cycle and is in networked communication with a plurality of human-machine interface (HMI) devices each having a display screen, the method comprising:

providing access, via each of the HMI devices and via the PLC, to a first set of the control screens, including displaying buttons labeled with a corresponding function of one of the control screens via a respective one of the display screens;

receiving input signals via the PLC from a requesting one of the HMI devices, wherein the received input signals identify the requesting HMI device and request one of a control action and a monitoring action for a corresponding one of the workstations;

providing the requesting HMI device with access to a second set of the control screens based on the received input signals, such that the plurality of HMI devices share an HMI control template that is also dynamically and individually scalable to the requesting HMI device;

controlling the process line via the PLC in response to control signals from the HMI devices corresponding to selections from the first and second sets of control screens;

determining, as an HMI scan at the end of the calibrated clock cycle, whether active communications remain ongoing between the PLC and the requesting HMI device;

incrementing a counter via the PLC when the active communications are not ongoing;

resetting the counter when the active communications are ongoing; and indicating a fault via the display screen of the requesting HMI device when the counter reaches a calibrated number of the HMI scans.

2. The method of claim 1, wherein the first set of the control screens includes a sign-of-life function, a home position control function, a fault/reset function, a screen name function, a station name function, and a date/time function.

3. The method of claim 1, further comprising assigning the unique screen numbers in increments of 10.

4. The method of claim 1, wherein providing the requesting HMI device with access to a second set of the control screens includes depicting a function corresponding to the assigned increment on a corresponding button of the display screen of the requesting HMI device.

5. The method of claim 1, wherein providing the requesting HMI device with access to a second set of the control screens includes moving data from the PLC to the requesting HMI device when the received input signals correspond to the requested monitoring action.

6. The method of claim 1, further comprising: moving or copying data from the requesting HMI device to the PLC when the received input signals correspond to the requested control action.

7. The method of claim 1, wherein providing the requesting HMI device with access to a second set of the control screens includes displaying a status for each part type of a plurality of parts used in the process line.

8. A control system for use with a process line having a plurality of workstations and a plurality of human machine interface (HMI) devices, the control system comprising:

a plurality of sensors operable for measuring or detecting a state of a device used in a corresponding one of the workstations;

a plurality of actuators responsive to control signals; and a programmable logic controller (PLC) in networked communication with the HMI devices and the actuators, having a calibrated clock cycle, and programmed with a plurality of control and monitoring functions for the process line, wherein the PLC is operable for outputting the control signals to the actuators in response to input signals from the HMI devices and the sensors to thereby control operation of the process line;

wherein the PLC is provided with a plurality of control screens each having a unique screen number, and is configured to:

provide access via each of the HMI devices to a first set of the control screens;

receive input signals from a requesting one of the HMI devices that identifies the requesting HMI device and requests one of a control action and a monitoring action for a corresponding one of the workstations;

provide the requesting HMI device with access to a second set of the control screens based on the received input signals, such that the plurality of HMI devices share an HMI control template that is also dynamically and individually scalable to the requesting HMI device;

control the process line via the PLC in response to control signals from the HMI devices corresponding to selections from the first and second sets of control screens;

determine, as an HMI scan at the end of each clock cycle using the counter, whether active communications remain ongoing between the PLC and the HMI devices;

increment the counter via the PLC when the active communications are not ongoing;

reset the counter when the active communications are ongoing; and indicate a fault when the counter reaches a calibrated number of the HMI scans.

9. The control system of claim 8, wherein the first set of the control screens includes a sign-of-life function, a home position control function, a fault/reset function, a screen name function, a station name function, and a date/time function.

10. The control system of claim 8, wherein the PLC is configured to assign a unique screen number to each of the control screens in increments of 10.

11. The control system of claim 8, wherein the PLC is configured to provide access to the first set of the control screens and to the second set of the control screens by depicting a function of the assigned increment of the control screens on a corresponding button in a display screen of a corresponding one of the HMI devices.

12. The control system of claim 8, wherein the PLC is configured to provide access to the one or more HMI devices to a second set of the control screens by moving or copying data from the PLC to the HMI device when the received input signals correspond to the requested monitoring action.

13. The control system of claim 8, wherein the PLC is configured to move or copy data from the requesting HMI device to the PLC when the received input signals correspond to the requested control action.

14. The control system of claim 8, wherein the PLC is configured to provide access to the one or more HMI devices to a second set of the control screens by displaying a status for each part type of a plurality of parts used in the process line.

15. The control system of claim 8, wherein the first calibrated set of the control functions includes a sign-of-life function, a cycle type/mode function, and a home position control function.

* * * * *